US012571928B2

(12) United States Patent
Servera Mas et al.

(10) Patent No.: US 12,571,928 B2
(45) Date of Patent: Mar. 10, 2026

(54) DEVICE FOR DETECTING IONISING RADIATION AND DOSIMETER COMPRISING THEREOF

(71) Applicant: INTEGRATED CIRCUITS MALAGA, S.L., Alaro (ES)

(72) Inventors: Bartomeu Servera Mas, Llucmajor (ES); Angel Barbancho Sanchez, Palma (ES); Alvaro Pineda Garcia, Alaro (ES)

(73) Assignee: INTEGRATED CIRCUITS MALAGA, S.L., Alaro (ES)

( * ) Notice: Subject to any disclaimer, the term of this patent is extended or adjusted under 35 U.S.C. 154(b) by 145 days.

(21) Appl. No.: 18/504,257

(22) Filed: Nov. 8, 2023

(65) Prior Publication Data

US 2024/0159925 A1     May 16, 2024

(30) Foreign Application Priority Data

Nov. 10, 2022     (ES) ............................... ES202230966

(51) Int. Cl.
G01T 1/24          (2006.01)
G01T 1/02          (2006.01)
(52) U.S. Cl.
CPC ................ G01T 1/244 (2013.01); G01T 1/02 (2013.01)

(58) Field of Classification Search
CPC .................................. G01T 1/244; G01T 1/02
See application file for complete search history.

(56) References Cited

U.S. PATENT DOCUMENTS

| | | | | |
|---|---|---|---|---|
| 10,012,739 B1 * | 7/2018 | Ginzburg | .................. | G01T 1/02 |
| 2021/0096268 A1 * | 4/2021 | Yadegari | ............... | H10F 39/103 |
| 2021/0341632 A1 * | 11/2021 | Roizin | ............... | H10F 39/8057 |

* cited by examiner

*Primary Examiner* — Hugh Maupin

(74) *Attorney, Agent, or Firm* — LUCAS & MERCANTI, LLP

(57) ABSTRACT

Device (1) for detecting ionising radiation comprising: a first set (10) with a plurality of primary floating gate sensors (100) with a cumulative response proportional to a received ionising radiation; a second set (20) with a plurality of secondary floating gate sensors (200) with a cumulative response proportional to the received ionising radiation. The primary sensors (100) have a sensitivity to ionising radiation above a first threshold. The secondary sensors (100) have a sensitivity to ionising radiation above a second threshold lower than the first threshold, whereby the first set (10) is configured to detect ionising radiation in a first range and the second set (20) is configured to detect ionising radiation in a second range, and the first range is lower than the second range.

16 Claims, 7 Drawing Sheets

Device

Second
sensors

First
sensors

Total Dosis (Gy)

DEVICE FOR DETECTING IONISING RADIATION AND DOSIMETER COMPRISING THEREOF

CROSS-REFERENCE TO RELATED APPLICATION

This application claims priority of Spanish Application No. 202230966, filed Nov. 10, 2022, the content of which is incorporated herein by reference.

FIELD OF THE INVENTION

This invention belongs to the area of passive dosimetry capable of providing an instantaneous estimation of the dose of ionising radiation received. It is applicable to personal dosimeters.

BACKGROUND OF THE INVENTION

Personal dosimetry is an extremely important tool in the field of radiological protection, which consists of the personal and individualised monitoring of the dose received on a continuous basis by workers potentially exposed to ionising radiation (gamma, X-rays, neutrons, beta).

Broadly speaking, there are two main types of personal dosimeters. Electronic personal dosimeters (EPD) or active dosimeters are electronic devices that measure radiation instantaneously and can give an immediate radiation reading. To do so, they need a source of electrical power to operate at all times. The second type is passive dosimeters. These devices do not require energy to operate and carry out a cumulative type of measurement of the dose received. Therefore, the information on the total dose received is stored intrinsically and permanently in the device itself.

Passive dosimeters are currently preferred for use as personal dosimeters and in most cases are the only type accepted for regulatory and compliance purposes.

The main technologies used today as passive dosimeters in personal dosimetry are the TLD (Thermo Luminescent Dosimeter) and the OSL (Optical Stimulated luminescent dosimeter). The main advantage of these devices is their broad detection capability. They are capable of detecting minimum doses of less than 100 µGy (10 mrem) and have a measurement range of more than 10 Gy. This means that both TLDs and OSLs have established themselves as a de facto standard in the field of personal dosimetry. Their main disadvantage is that they cannot give an immediate reading of the dose received. These devices have to be sent to accredited laboratories for reading on a regular basis (monthly or quarterly in most cases). This is a major drawback to guarantee the ALARA (As Low As Reasonably Achievable) principle, since, if overexposure occurs, it cannot be detected until the dosimeter is analysed, which may have taken too long and compromised the safety of the worker.

This limitation of TLDs and OSLs means that there is a significant need for passive dosimeters that allow an immediate dose reading and still offer a similar detection capability to TLDs and OSLs.

One of the solutions that has been most widely studied are electronic floating gate devices. These are based on a MOSFET transistor where the gate is fully electrically isolated. The main advantage is the possibility to implement a passive dosimeter in standard CMOS technology, so they can be manufactured with the readout circuits in the same device allowing instantaneous dose readout whenever needed. The main disadvantage is that the detection capability is significantly lower than that of TLDs and OSLs.

The limitations of floating gate dosimeters in terms of detection capability are due to the characteristics of the manufacturing process itself and their small detection volume. While not being exhaustive in this description, the main limitation is that the ionising medium is a silicon oxide where the electrical charges generated by the ionising radiation have a very low mobility. This makes the efficiency or sensitivity of the sensor (expressed in mV/rem) relatively low. Furthermore, the detection volume is very small, so that few charges are produced in response to the radiation.

At present, floating gate sensors with sensitivities higher than 3 mV/rem have not been achieved. This implies that in order to guarantee a minimum detectable dose of less than 100 µGy comparable to TLD and OSL, the device has to be able to discern voltage changes below 30 uV in a reliable and reproducible way. This is very complex considering the intrinsic electronic interference of the device itself.

It is equally complex to simultaneously achieve a detection range of at least 10 Gy. Continuing with the example of a sensor with a sensitivity of 1 mV/rem, this implies a measurement range of 1V, which imposes on the sensor a minimum dynamic range of 100 dB (ratio between the maximum and minimum detectable dose equal to 100,000).

Another main limitation of floating gate dosimeters is the thermal dependence of the electrical characteristics of the MOSFET transistor, which results in an added difficulty in detecting minimum doses below 100 µGy in real conditions of use, e.g., in a temperature range between 10° C. and 30° C.

In the same way, another limitation of floating gate devices is their humidity dependence due to the capacitive nature of the sensor itself (this is, the voltage due to electrical charge stored in the floating gate capacitor changes with humidity). Due to the difficulty of achieving a completely hermetic commercial package, this humidity dependence results in notable limitations in terms of minimum detectable dose, especially considering that these devices are usually specified for relative humidity ranges between 10% and 90% typically.

An additional limitation of electronic floating gate devices is that tolerances in the silicon wafer fabrication processes cause significant variations in the sensitivity of the devices, and therefore this sensitivity must be estimated individually for each device.

However, this means that floating gate devices in standard CMOS technology have not been adopted today as substitutes for TLDs and OSLs despite their potential for designing a passive dosimeter with immediate readout capability.

A variant of the floating gate technology is the DIS (Direct Ion Storage) technology.

They are essentially a combination of a closed ionisation chamber and a floating gate. This uses some additional manufacturing process that allows the sensor core (floating gate) to be exposed and in direct contact with air or a gas, combined with special encapsulation techniques that surround the sensor core creating the ionisation chamber. This increases the volume of the ion generation zone in a medium where the mobility of the electrical charges generated by ionisation is much higher than in a medium such as silicon dioxide. The main advantage of this is a significant increase in the efficiency of the sensor, reaching sensitivities in the range of 20 V/rem. This increase of more than 3 orders of magnitude in sensitivity allows reproducible achievement of minimum detectable doses of less than 10 µGy with instantaneous readout capability. The main limitations of floating gate-based solutions mentioned above, such as intrinsic electronic interference or temperature dependence, are less problematic as their relative impact is less due to the higher sensitivity of the sensor to radiation.

This means that personal dosimeters based on DIS technology have been commercialised and adopted in some cases as an alternative to TLDs and OSLs.

The main disadvantages associated with this technology compared to floating gate devices manufactured in standard CMOS technology are the need for additional manufacturing processes and the requirement for specific encapsulation, which results in a more costly and complex manufacturing process.

Likewise, its main disadvantage compared to TLDs and OSLs is a narrower operating range of only 0.05 Gy with instantaneous readout capability.

This limitation in the maximum dose continues to be a significant drawback in terms of ensuring worker safety in cases of overexposure or accidental exposure. There is a need in these cases to be able to measure from 1 Gy to at least 10 Gy with instantaneous reading capability, in order to be able to determine such overexposure and to be able to proceed with the administration of the relevant treatments as quickly as possible.

BRIEF DESCRIPTION OF THE INVENTION

The present invention relates to a device that detects ionising radiation based on floating gate technology (specifically, floating gate capacitance) as defined in claim 1. Additionally, the invention relates to a passive dosimeter integrating such a device for detecting ionising radiation (in short, device). The proposed device addresses the main disadvantages mentioned above.

Throughout this document, terms are used with their generally accepted meaning. However, the following definitions are given for ease of understanding.

Ionising radiation means radiation with sufficient energy to extract electrons from atoms. Ionising radiation may be in the form of electromagnetic waves or in the form of subatomic particles.

A floating gate sensor is a component, usually manufactured in CMOS technology, based on a capacitor or condenser with one of its terminals galvanically isolated so that no conductive element is connected to it and which allows a permanent or semi-permanent electrical charge to be stored.

The sensitivity of a floating gate sensor means the rate of change of the voltage in the floating gate capacitance with respect to the total amount of ionising radiation received.

The device, in one implementation, integrates a first set of floating gate sensors that are ideally identical and independent of each other. The reading of the sensor array can be averaged, e.g. by calculating the arithmetic mean, thereby reducing the intrinsic electronic interference of the set and improving the minimum detectable dose of the dosimeter. The number of sensors can be digitally programmed, so that the power consumption can be flexibly adjusted according to the requirements of the application. Also, the number of sensors can be used to adjust the electrical interference or to exclude defective sensors.

The device, in one implementation, integrates a second set of floating gate sensors that are ideally identical and independent of each other, and with a reduced sensitivity compared to the first set of sensors. This second set of sensors ensures a higher measuring range than the first set.

In certain implementations, the sensitivity of the first and second sets of floating gate sensors is such that it allows the device to cover a detection range of at least 80 dB, from a minimum detectable dose equal to or less than 100 µGy to a maximum detectable dose of at least 1 Gy.

This wide range is achieved by maximising the sensitivity of the first set of sensors, for example, by minimising the capacitance of the capacitor of the first type of sensor and/or by increasing the gain of the readout circuitry. The second set is deliberately designed with a lower sensitivity, for example, by increasing the capacitance of the capacitor of the second type of sensor and/or by reducing the gain of the readout circuits with respect to the sensors of the first set. Thus, if both sets are charged to the same initial voltage and have the same maximum allowable discharge level, the second set will allow a larger total amount of radiation to be measured, while the first set will allow smaller amounts of radiation to be measured, but with greater accuracy.

In certain implementations, the humidity dependence of the first floating gate sensor is identical or similar to the humidity dependence of the second floating gate sensor. This can be achieved, among other means, by constructing the capacitor of both floating gate sensors with the same dielectric material. This allows to correct, or at least mitigate, the humidity dependence of the device by making a combined reading of both sensors (for example, by subtracting the reading of the second sensor from the reading of the first sensor). Additionally, or alternatively, the humidity dependence can be corrected or mitigated at least, by way of a combined reading of the first set of sensors and the second set of sensors. Such a combined reading can be implemented inside the device using existing components or outside (e.g. via software).

The device in certain implementations integrates an active circuit that generates a non-radiation sensitive voltage reference and is used as a reference signal to determine the total dose received by the device. This voltage reference also allows its temperature coefficient to be calibrated so that it can be adjusted to minimise the thermal response of the device.

Active circuit means any element or set of elements, such as diodes, transistors, etc., that require electrical power to operate.

In certain implementations, the device integrates a temperature sensor that can be used to correct the residual thermal dependence of the sensor, via post-processing, and/or to perform a temperature self-calibration procedure.

In certain implementations, the device integrates a nonvolatile, write-once memory element that is used to record a serial number or identifier that is unique to each device.

In certain implementations, the device integrates all the means to digitise the reading of the various sensors of the device and transmit this reading in digital format via a standard digital interface (e.g. SPI, I2C or similar).

The device, in some implementations, integrates a replicated floating gate sensor structure, with elements to measure the electrical capacitance of such a structure. This is used to estimate the capacity of the floating gate sensors of the first set and/or the second set. Using such an estimate, the radiation sensitivity of the sensors can be calculated without the need to expose them to a radioactive source.

Preferably, the entire set of elements is fabricated on a single substrate of semiconductor material, in a monolithic form, using a standard CMOS compatible manufacturing process, and uses a standard type package. This allows it to be mass-producible and cost-effective.

Optionally, in some implementations, the device can integrate a heating element that allows a self-calibrating operation to be carried out autonomously, without the need for external means such as climatic chambers, ovens or similar. This heating element can additionally be used for any other purpose suitable for the application. For example, characterisation of the eventual discharge of the floating gate at high temperatures, or for curing processes necessary to stabilise the charge injected into the floating gate after reloading.

BRIEF DESCRIPTION OF THE FIGURES

The implementations of the present invention are described, by way of example only, in the attached illustrations in which the similar elements are numbered in the same way in the various Figures.

NUMERICAL REFERENCES GLOSSARY

1 Device.
10 First set of sensors.
11 Digital configuration signal of the first set.
12 Analogue output signal of the first set.
13 Digital output signal of the first set.
14 Reference voltage of the first set.
19 Injector voltage.
20 Second set of sensors.
21 Digital configuration signal of the second set.
22 Analogue output signal of the second set.
23 Digital output signal of the second set.
24 Reference voltage of the second set.
30 Temperature sensor.
31 Digital configuration signal of the temperature sensor.
32 Analogue output signal of the temperature sensor.
33 Digital output signal from the temperature sensor.
40 Voltage reference module.
41 Digital signal configuration of the voltage reference module.
50 Analogue-to-digital converter, ADC.
55 Conversion module.
60 Sensitivity tester.
63 Digital input/output signal for the control and readout of the sensitivity tester.
70 Storage and control module (with serial number of the device)
80 Digital communication interface.
90 Heater module.
91 Heater control signal.
100 Floating door sensor of the first set.

101 Floating Gate Capacitance.
102 Recharge circuit.
103 Primary transconductor.
104 Secondary transconductor.
106 Configuration register.
107 Switch.
108 First set electrical current measurement.
109 Reference electric current of the first set.
110 Averaging circuit.
111 Averaged measurement electric current.
112 Averaged reference electric current.
150 Averaging and subtraction module.
200 Floating gate sensor of the second set.
208 Second set measuring current.
209 Reference electric current of the second set.
410 First set reading.
420 First set reading check.
430 Second set reading.
500 Total dynamic range.
501 Dynamic range of first set.
502 Dynamic range of second set.

DESCRIPTION OF METHODS OF IMPLEMENTATION

Referring to the above figures, without being restrictive, various implementations of the invention are presented for a better understanding.

Figure 1:
FIG. 1: Schematic block diagram of the device according to the present invention.

FIG. 1 schematically shows a device 1 comprising the following elements.

A first set (10) of floating gate sensors (100) independent and ideally identical to each other. The sensors of the same set may have slight differences between them due to possible errors and tolerances in the manufacturing process. Details of the floating gate sensor (100) are described below.

A second set (20) of independent and identical floating gate sensors (200), wherein the sensors of this second set differ from the sensors of the first set in that they have a lower sensitivity to ionising radiation.

Both the first (10) and the second set (20) of sensors can be configured by means of a series of digital signals (11, 21). These digital signals allow to configure, among others, the number of active sensors within each of the sets, the characteristics of these sensors, such as their transconductance value, current consumption, etc. Both the first (10) and second sets (20) include floating gate sensors (100, 200) providing a series of analogue signals (108, 208) proportional to the total dose of ionising radiation received by the device and a series of analogue signals (109, 209) independent of the total dose of ionising radiation received by the device.

A temperature sensor (30) providing a series of analogue signals (32) proportional to the temperature and independent of the total dose of ionising radiation received by the device. The temperature sensor (30) can be configured using a series of digital configuration signals (31). These digital configuration signals allow, among other things, activation or deactivation of the temperature sensor (30) itself, configuration of the temperature sensitivity of the temperature sensor (30), etc. This temperature sensor (30) allows the temperature of the different floating gate sensors (100, 200) of device 1 to be estimated and the subsequent correction of its temperature dependence, by means of a series of calculations or calibration algorithms, as explained later.

A voltage reference module (40) generates different reference voltages (14, 24) used by the first set (10), and by the second set (20) as described below. The voltage reference module (40) receives a series of digital configuration signals (41) that allow certain characteristics of the generated reference voltages to be configured, such as their absolute value or their temperature dependence. This possibility of configuring the temperature dependence of the reference voltages can be used to advantageously minimise the temperature dependence of the sensors, as will be discussed below. A conversion module (55) for reading the load of the first set (10) and the second set (20). The conversion module (55) may include one or more averaging and subtraction modules (150), which receive as input the electrical output currents (108 and 109) of the first set (10) and the electrical output currents (208 and 209) of the second set (20). Such averaging and subtraction modules 150 provide as output an analogue signal (12, 22) proportional to the total radiation dose received by the first set of sensors (10) and the second set of sensors (20) respectively. The conversion module (55) may also include one or more analogue-to-digital converters (50) that receive the analogue output signals from the averaging and subtraction modules (12, 22) and/or the analogue output signals from the temperature sensor (32) as input and provide as output a series of digital signals (13, 23, 33) representing the value of the analogue input signals.

One implementation of the conversion module (55) may include several independent analogue-to-digital converters (50), one for each of these signals (12, 22, 32). Another implementation of the conversion module (55) may include a single analogue-to-digital converter (50), such that the various analogue input signals are connected to it sequentially by a series of selectors or multiplexers which are in turn controlled by one or more digital control signals.

Another implementation of the conversion module (55) may include a single averaging and readout module (150), such that both sets of sensors (10 and 20) are sequentially connected thereto.

In another possible implementation of the device, the device could directly provide the analogue signals (12, 22, 32) or a subset thereof as outputs.

Figure 2:
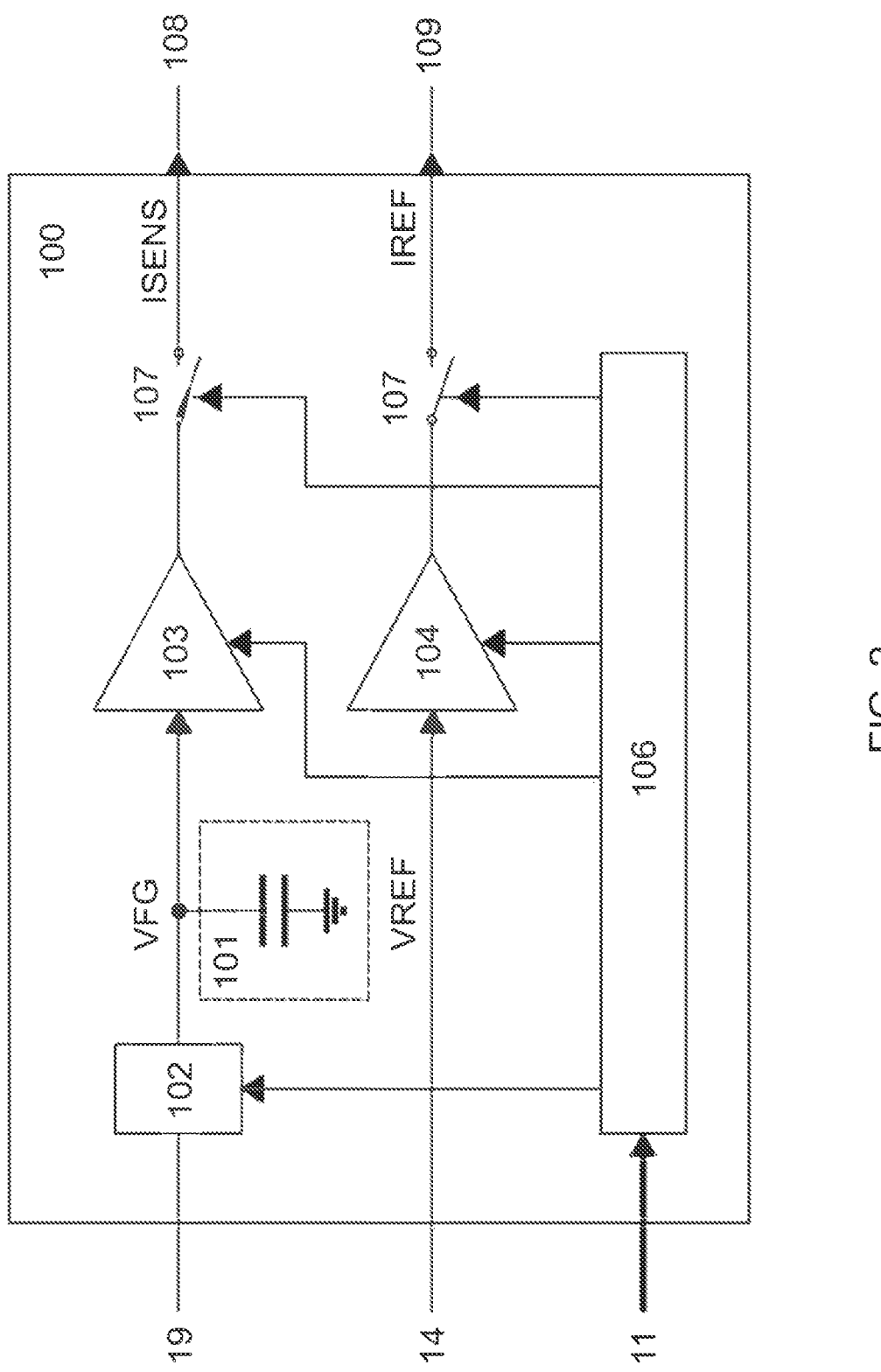
FIG. 2: Schematic diagram of the floating gate sensor structure of the device.

A sensitivity tester (60) for estimating the electrical capacitance of the various floating gate sensors (100, 200) and, from this estimate, determining the sensitivity to ionising radiation of such sensors without the need for any additional irradiation or testing for this purpose. The sensitivity tester (60) can be implemented by a replica of the floating gate capacitance (101 and/or 201 as shown in FIG. 2) connected to a circuit for measuring its electrical capacitance.

An information storage and control module (70) may comprise a set of registers where information concerning the configuration of the other blocks of the system, such as those described above, as well as information concerning sensor measurements, represented by digital signals (13, 23, 33), may be stored.

The storage and control module (70) includes a series of One Time Programmable (OTP) non-volatile memory elements, which are used to record a serial number or identifier that is unique to each device (1). This serial number or identifier allows the identification and traceability of the device (1) and its unambiguous assignment to a patient, medical personnel, etc. using a dosimeter containing the device. The module (70) may also include additional non-volatile memory components for permanent storage of calibration parameters, such as calibration sensitivity data, etc.

The information storage module (70) also includes a number of digital circuits for managing the operation and configuration operations of the device (1). For example, the activation/deactivation of certain sensors (100, 200) in each set (10, 20), the sequential connection of the ADC (50) to the averaging and subtraction module (150), the sequential connection of the averaging and subtraction module (150) to the first set (10) or the second set (20).

A digital communication interface (80) allows digital values to be communicated between the information storage and control module 70 and other electronic devices external to the device (1). This communication interface (80) may be of a standard type, e.g., SPI or I2C, so that the device is compatible with as many electronic devices as possible.

The device (1) as a whole can be fabricated monolithically, on a single substrate of semiconductor material (e.g., silicon) using standard manufacturing techniques, such as those used in the manufacture of CMOS integrated circuits. This facilitates production.

FIG. 2 shows the structure of a floating gate sensor (100) as used in FIG. 1 in the first or second set. The floating gate sensor (100) comprising the following elements: a floating gate capacitance (101), a recharge circuit (102) capable of injecting an electrical charge into the floating gate capacitance such that a voltage is generated between the terminals of the floating gate capacitance and wherein said charge is permanently stored, a primary transconductor (103) connected to the floating gate capacitance (101), so that it can convert the voltage of the floating capacitance (101) into a proportional electric current, a secondary transconductor (104) ideally identical to the primary one, connected to a reference voltage (14), a configuration register (106) which encodes and stores information about the configuration of the sensor. The floating gate sensor (100) also includes a number of additional elements, such as switches or toggles (107), which enable both outputs of the transconductors (103, 104) of a single floating gate sensor (100) to be switched off together.

The main feature of the floating gate capacitance (101) is that one of its terminals (VFG) has no conductive element connected to it, so that the electrical charge injected via the recharge circuit (102) is permanently stored. A second feature of the floating gate capacitance is that the electrical charge stored in the capacitance varies as a function of the total dose of ionising radiation received, so that the voltage at the capacitance terminals is reduced proportionally and linearly to the dose received. This is achieved because the ionising radiation passing through the dielectric material (silicon dioxide) between the terminals of the floating gate capacitor strips electrons from the atoms of the material (ionises the material). These electrons are accelerated towards the positive terminal (VFG) by the electric field between the plates of the floating gate capacitor. Electrons reaching the positive terminal of the capacitor thus cause a reduction of the effective electric charge and hence a reduction of the voltage difference between the terminals of the capacitor (i.e., the voltage at VFG is reduced in proportion to the dose of ionising radiation received).

The rate of voltage change in the floating gate capacitance as a function of the total dose of ionising radiation received is defined as sensitivity. In one implementation example, the floating gate sensors (100) of the first set (10) are designed to have a sensitivity around 1 mV/rem.

The transconductor elements (103, 104) include an element or set of elements, such as MOSFET transistors, resistors, capacitors or any other element available in a standard CMOS manufacturing process, capable of converting an input voltage into an electrical current proportional to that voltage. In the case of the floating gate sensor MOSFET, two ideally identical transconductors (103, 104) are used where the primary transconductor is connected to the floating gate capacitance (101) and the secondary transconductor is connected to a reference voltage (14), the main feature of which is that the reference voltage (41) is independent of the total radiation dose. In one implementation of this invention the transconductor elements (103, 104) may have a transfer function around 0.1 uA/mV, although this value may be varied as appropriate. Similarly, the transducer elements may be configurable, such that this value may be programmed by means of the contents stored in the configuration register (106).

Thus, each floating gate sensor (100) generates two electrical measurement currents $I_{SENS}$ (108) and reference current $I_{REF}$ (109), where only one of them $I_{SENS}$ (108) depends on the total received dose of ionising radiation. Information on the total dose received by the sensor can therefore be estimated from the difference of these two currents.

The recharge circuit (102) includes an element or set of elements, such as capacitances, diodes or MOSFET transistors, for supplying an electrical charge to the floating gate capacitor such that this charge input is unidirectional and once injected into the capacitance, the capacitance is not discharged. This charge injection can be achieved by various known physical effects, such as the tunnel effect or hot electron injection. The recharge circuit (102) may require a voltage (19) to operate, which may be between 7V and 30V typically, depending on the manufacturing technology used for the floating gate sensors, as well as the element or set of elements used to construct it.

Each floating gate sensor (100) includes a configuration register (106) which stores a unique identifier for each sensor within the set, as well as information relating to the configuration of the sensor in digital format. This identifier is unique within the set so that each sensor can be configured independently using a series of digital signals (11). The sensor configuration information may include, among other variables, the gain of the transconductor elements (103 and 104), the state of the switches (107) (open or closed), control variables for injecting charge with the recharge circuit (102) (on for injecting, off for not injecting, etc.), etc.

Depending on the contents stored in the configuration register memory element (107) of each sensor (106), the sensor can be configured in at least two different ways: active or inactive. When a sensor is configured as active, the output of its primary transconductor (103) $I_{SENS}$ (108) is connected to the outputs of the primary transconductor of the rest of the sensors of the set configured as active. Similarly, the output of the secondary transconductor (104) $I_{REF}$ (109) is connected to the outputs of the secondary transconductor of the rest of the sensors configured as active.

When a floating gate sensor (100) is configured as inactive, the outputs of its primary and secondary transconductor (103, 104) are disconnected, so that they do not provide any electrical current to the set. These operations of switching the sensor on and off within the set are performed by a series of switches 107 integrated as part of the sensor (100) itself. The corresponding floating gate capacitance (101) continues to perform its sensing function whereby its VFG voltage is reduced with the total radiation dose received. However, as both transconductors (103 and 104) are disconnected from the set by the switch (107), they do not provide their reading.

This disabling functionality is useful to isolate those floating gate sensors (100) that may have a defect, or to program the total number of sensors to be used in a given measurement. For example, if for some reason a lower resolution measurement is sufficient, this can be carried out using a reduced number of sensors, which can reduce the current consumption used for the reading. This is a benefit in battery-powered systems such as a dosimeter where this device can be used.

Figure 3:
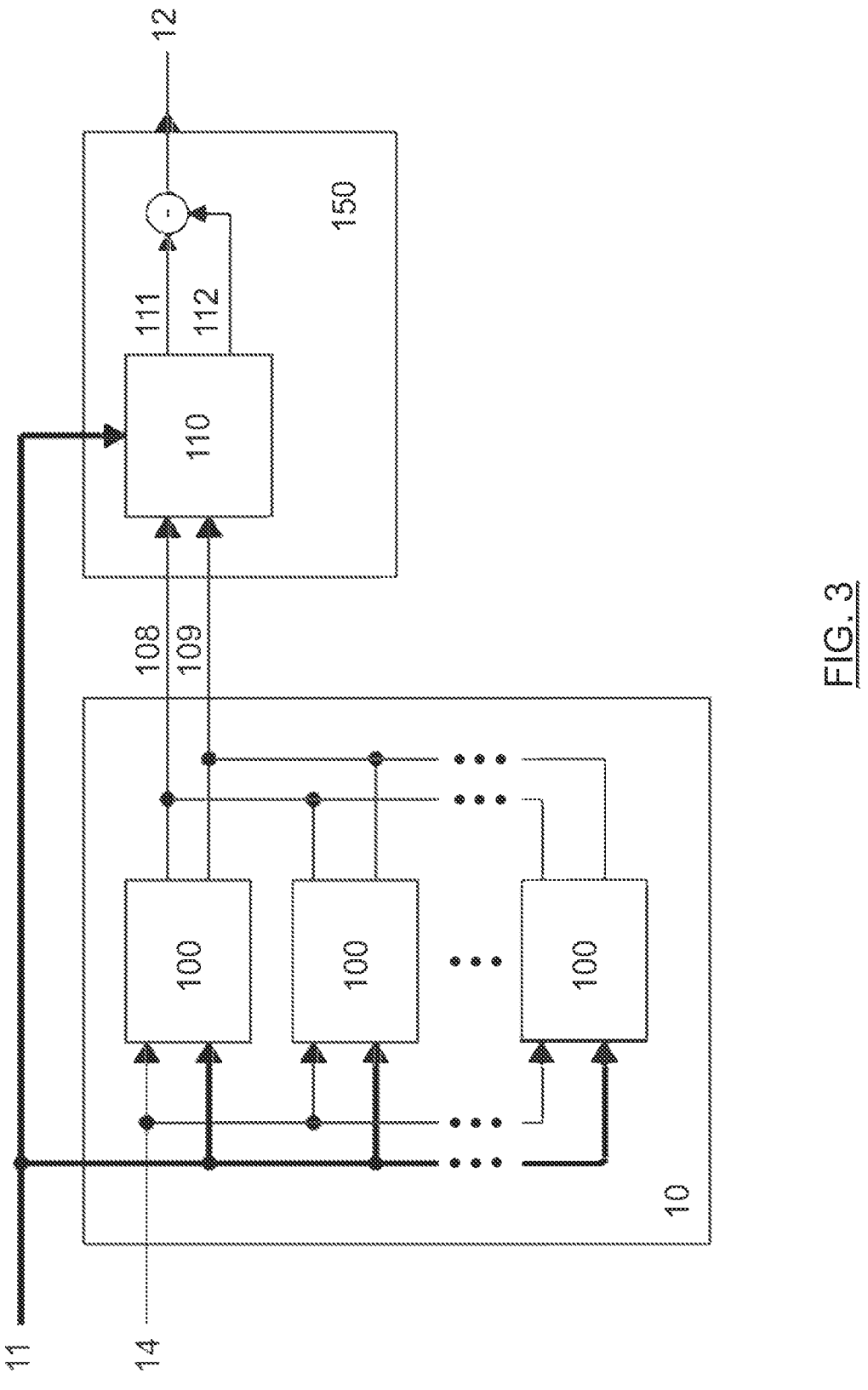
FIG. 3: Schematic block diagram for selective activation of the first set of floating gate sensors.

FIG. 3 shows how several floating gate sensors (100) of the first set (10) are selectively activated to average readings excluding the inactive ones by means of the averaging and subtraction module (150). As described above, each floating gate sensor (100) that has been activated within the set (10) outputs two electrical currents. One measured electrical current $I_{SENS}$ (108), which varies proportionally to the total ionising radiation dose received by the active floating gate sensors (100) in the device. The other is the reference current $I_{REF}$ (109), which is independent of the total ionising radiation dose.

All (dose-dependent) measurement currents $I_{SENS}$ (108) are added together and averaged. The same applies to the reference (dose-independent) currents $I_{REF}$ (109). For this purpose, the first set (10) of floating gate sensors (100) is connected to the averaging and subtraction module (150). This averaging and subtraction module (150) includes an analogue averaging circuit (110), which divides the resulting two summation currents by an N constant equal to the number of active sensors within the set. The value of this N constant is provided to the averaging circuit (110) by a series of digital signals (11).

Thus, the analogue averaging circuit (110), according to one embodiment, outputs two currents, $I_{SENS\_AVG}$ (111), and $I_{REF\_AVG}$ (112) equal to the average value of the currents provided by the various floating gate sensors that are active within the set (10). The first of these two currents $I_{SENS\_AVG}$ (111) remains proportional to the total ionising radiation dose received, while the second current $I_{REF\_AVG}$ (112) remains independent of the dose.

$$I_{SENS\_AVG} = \Sigma I_{SENS(x)}/N \text{ for } x=1 \text{ to } x=N$$

$$I_{REF\_AVG} = \Sigma I_{REF(x)}/N \text{ for } x=1 \text{ to } x=N$$

The difference of the output currents (111, 112) of the analogue averaging circuit (110) is proportional to the total amount of ionising radiation received by the device:

$$\text{Dose} = K_i - (I_{REF\_AVG} - I_{SENS\_AVG})$$

Where $K_i$ is a constant that can be determined by some calibration method if necessary.

The current resulting from the subtraction of $I_{REF\_AVG} - I_{SENS\_AVG}$ (12) can be converted to a digital value to establish a digital signal from the first set (13) by means of an analogue-to-digital converter (50) included in the conversion module (55).

The more floating gate sensors are activated and averaged within a set, the greater the noise reduction obtained. Thus, the intrinsic electronic interference of each sensor (100) is reduced depending on how many sensors are averaged. This averaging technique reduces the minimum detectable dose. The first set of sensors (10) consists of a sufficient number of floating gate sensors (100) so that their averaged reading results in a minimum detectable dose equal to or less than 10 μGy (10 mrem). Generally, their number is in the range between 8 and 1024, more precisely in the range between 64 and 256, depending on the noise characteristics of the sensor's constructive elements, such as MOSFET transistors, capacitors, resistors, etc.

Although the arithmetic mean has been considered, another type of statistical calculation could be implemented to provide a better representative value according to a given criterion, e.g. (selection of subsets with higher correlation, lower dispersion, etc.).

The number of active sensors, N, within the sets is programmable. Specifically, the first set (10) can be digitally configured by means of a series of digital configuration signals (11). Similarly, the second set with the sensors (20) has an equivalent digital configuration signal (21). Thus, the device allows optimisation of the power consumption during reading according to the sensing capability required at any given time.

Figures 4, 5:
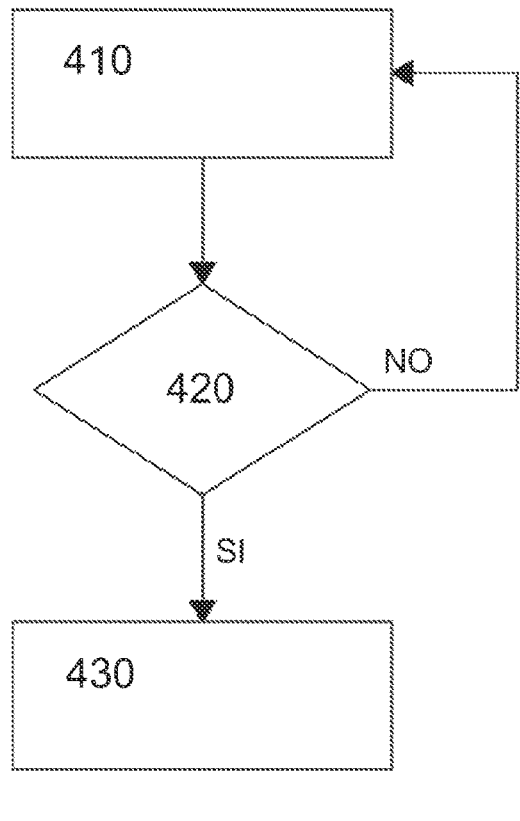
FIG. 4: Procedure for conditional reading of the first and second set of sensors.
FIG. 5: Combined detection range of the first sensor set with the second sensor set and individually per sensor set.

FIG. 4 schematically illustrates the flow of operations for a possible device sensor reading cycle. The cycle consists of a read operation of the first set (410), followed by a read verification operation of the first set (420). If successful, then the cycle continues with a read operation of the second set (430). The reading of the second set of sensors can be performed conditionally, in order to optimise the device reading time and to optimise the power consumption required for each reading. Thus, the reading cycle of the device starts by reading the first set of sensors. Only when this first set has reached its reading limit is the second set of sensors read.

Similarly, any of the sensor sets can be read independently and unconditionally if necessary.

With reference to FIGS. 1-3 above, the device (1) includes a second set (20) of floating gate sensors 200 as depicted in FIG. 1. The floating gate sensors (200) of this second set (20) have a similar structure to the floating gate sensors (10) of the first set (100) as depicted in FIG. 2, except that the floating gate capacity (201) is different from the floating gate capacity (101) of the first type. As described above, the floating gate capacitance (101) of the floating gate sensors (100) of the first set (10) is designed to have a total radiation dose sensitivity of the order of 1 mV/rad, or in any case as high as technologically achievable. This design specification can be achieved by using a floating gate capacitance having a sufficiently small capacitance.

The floating gate sensors (200) of the second set (20) incorporate a floating gate capacitance (201) that is designed for a significantly lower sensitivity, of the order of 10 µV/rad, representing a sensitivity 100 times lower than the pixel capacitance (10) of the first set (100). A design with this specification can be achieved by using a second type of floating gate capacitance that has a much higher capacitance than the floating gate capacitance of the first type (101), typically 100 times higher.

The remaining elements of the floating gate sensor (200) are the same as those described for the first type of floating gate sensor (100) as depicted in FIG. 1. The remaining elements of the second set (20) are the same as those described for the first set (10) as depicted in FIG. 3, except that the total number of sensors may be different from that of the first set. Similarly, the analogue signal or set of analogue signals (21) provided as output by the second set of sensors (20) are digitised by an analogue-to-digital converter (50) identical to that used for the first set of sensors. In fact, in an alternative implementation of the device, both sets of sensors (10, 20) can use a single analogue-to-digital converter (50), so that both sets of sensors are sequentially connected to the analogue-to-digital converter (50).

Since all these elements of the measurement chain are identical between both sets of sensors, the fact that the second set has a sensitivity 100 times lower means that its measurement range or maximum dose is 100 times higher than that of the first set of sensors. Likewise, if the number of sensors in both sets is the same, the minimum detectable dose of the second set will be 100 times higher than that of the first set.

Additionally, the floating gate capacitor 201 of the floating gate sensors 200 of the second set 20 shows a humidity dependence identical or similar to the floating gate capacitance 101 of the floating port sensors 100 of the first set 10. This may be achieved via components, for instance making the dielectric material of both floating gate capacitances 101 be the same. Additionally or alternatively, humidity dependence of the device can be corrected or mitigated by selectively combining readings from the first 10 and second set 20 (e.g. using software).

Through the combined use of two sets of sensors as described above, a minimum detectable dose of 100 µGy or less (through the averaged reading of the first set of sensors) and a measurement range of up to 10 Gy (through the second set of sensors) can be achieved.

FIG. 5 illustrates a particular case where the entire measurement chain has a dynamic range of 60 dB (i.e., a maximum to minimum dose ratio of 1000). In the bar graph, the first set of sensors (100) is sized to cover a range (501) from 100 µGy to 100 mGy. The second set of sensors (200) is sized to cover a range (502) from 10 mGy to 10 Gy. Thus, the described device is capable of covering a detection range (500) from the lower limit of the first set, 100 µGy to the upper limit of the second set, 10 Gy. The combined sizing of both sets of sensors is determined in such a way that there are no dead zones where neither set is operational. Conversely, there may be overlapping areas.

The informed reader will understand that the combined use of two or more floating gate sensors with different sensitivities and integrated in the same device results in multiple possible combinations.

As explained in the technical specification, one of the main limitations of floating gate-based devices is their dependence on temperature and the associated difficulty in achieving temperature compensation with sufficient accuracy to achieve minimum detectable doses equal to or less than 100 µGy under varying temperature conditions, for example, between 10° C. and 30° C.

Various embodiments of the present invention implement temperature compensation as explained below.

Returning to FIG. 2, if the set of the floating gate capacitor (101) and the transconductor element (103) is considered, the temperature coefficient TC $I_{SENS}$ of the output current (108) of the $I_{SENS}$ sensor can be expressed as:

$$TC_{ISENS} = TC_{CSENS} + TC_{MOSFET1}$$

Where $TC_{CSENS}$ is the temperature coefficient of the floating gate capacitance (101) and $TC_{MOSFET1}$ is the temperature coefficient of the transconductor element (103) connected to the floating gate capacitance (101).

A possible first approach to mitigate temperature effects in a floating gate sensor is to include a second primary transconductor element (104) identical to the transconductor element (103) connected to the floating gate capacitance (101). In this way, the output current of this secondary transconductor $I_{REF}$ compensates part of the thermal dependence of the floating gate sensor since the temperature coefficient of this secondary transconductor (104) $TC_{MOSFET2}$ is assumed to be equal to that of the primary transconductor (101).

This secondary transducer element is connected to a second floating gate capacitance $C_{DUMMY}$ which is not sensitive to radiation (or significantly less sensitive than the first capacitance). While this method makes it possible to compensate for the part of the sensor thermal response attributed to the transconductor element (103), the contribution of the floating gate capacitance (101) is not corrected, unless the non-radiation sensitive floating gate capacitance $C_{DUMMY}$ has a temperature coefficient $TC_{CDUMMY}$ identical to $TC_{CSENS}$.

$$TC_{IREF}=TC_{CDUMMY}+TC_{MOSFET2}$$

$$TC_{MOSFET2}=TC_{MOSFET1}$$

$$TC_{SENSOR}=TC_{ISENS}-TC_{IREF}=TC_{CSENS}-TC_{CDUMMY}$$

While this condition ($TC_{CSENS}=TC_{CDUMMY}$) is not physically impossible, the reader must understand that, due to the constructional differences of these two capacitances, it is not feasible to assume that this condition is easily fulfilled. In fact, for this $C_{DUMMY}$ capability to have zero radiation sensitivity, the differences with respect to the $C_{SENS}$ (101) sensing capability will be significant and their temperature coefficients can be expected to differ significantly as well. Thus, in practice, the sensor will have a residual thermal response caused by the difference between $TC_{CDUMMY}$ and $TC_{CSENS}$.

While this $TC_{SENSOR}$ thermal response may be significantly lower than the initial thermal response of the $TC_{ISENS}$ sensor, it is still expected to be a limiting factor in achieving minimum detectable doses of the order of 100 µGy under real (non-constant temperature) conditions. This temperature mitigation procedure has the additional advantage that the $C_{DUMMY}$ floating gate capability will always have a residual sensitivity to radiation (its sensitivity will not be totally zero). This residual sensitivity will have a reducing effect on the effective sensitivity of the sensor when the described temperature compensation procedure is implemented.

A second possible procedure to mitigate similar temperature effects is to use a secondary transconductor as well, but this time connected to a reference voltage. This option eliminates the problem associated with the residual sensitivity of the second $C_{DUMMY}$ floating gate capacitance. It is acceptable to assume that such a reference voltage has an independent response to radiation, at least for doses at or below the range of interest (10 Gy).

Ideally, this reference voltage can be assumed to have a temperature coefficient $TC_{VREF}$ equal to that of the floating gate capacitance (101) $TC_{CSENS}$, although the reader should understand that the actual robust implementation of such an electronic circuit is not feasible due to the constructional differences between the reference voltage and the floating gate capacitance. This means that, while it is possible to consider building a voltage reference that eventually has the same temperature coefficient as the floating gate capacitance, it is unreasonable to think that this condition can be guaranteed throughout series production, due to the manufacturing process tolerances.

A third possible procedure to mitigate the effects of temperature has been proposed. It is also to use a secondary transconductor, ideally identical to the primary transconductor, to implement a closed-loop system, so that the system copies the voltage of the floating gate capacitance. While from a theoretical point of view this technique could provide an optimal result, its actual implementation is affected by defects and tolerances inherent in the manufacturing process. Thus, any differences between the primary and secondary transconductor, as well as offset errors in the feedback loop, will result in a residual thermal response.

Thus, the three procedures described above have certain limitations to ensure that the dosimetry thermal response compensation is sufficiently accurate to meet the desired requirements for personal dosimetry applications (minimum detectable dose equal to or less than 100 µGy) and that it works. These limitations become more apparent when larger scale industrial mass production is envisaged.

Considering the above, an alternative thermal calibration is proposed as explained below.

Figure 6:
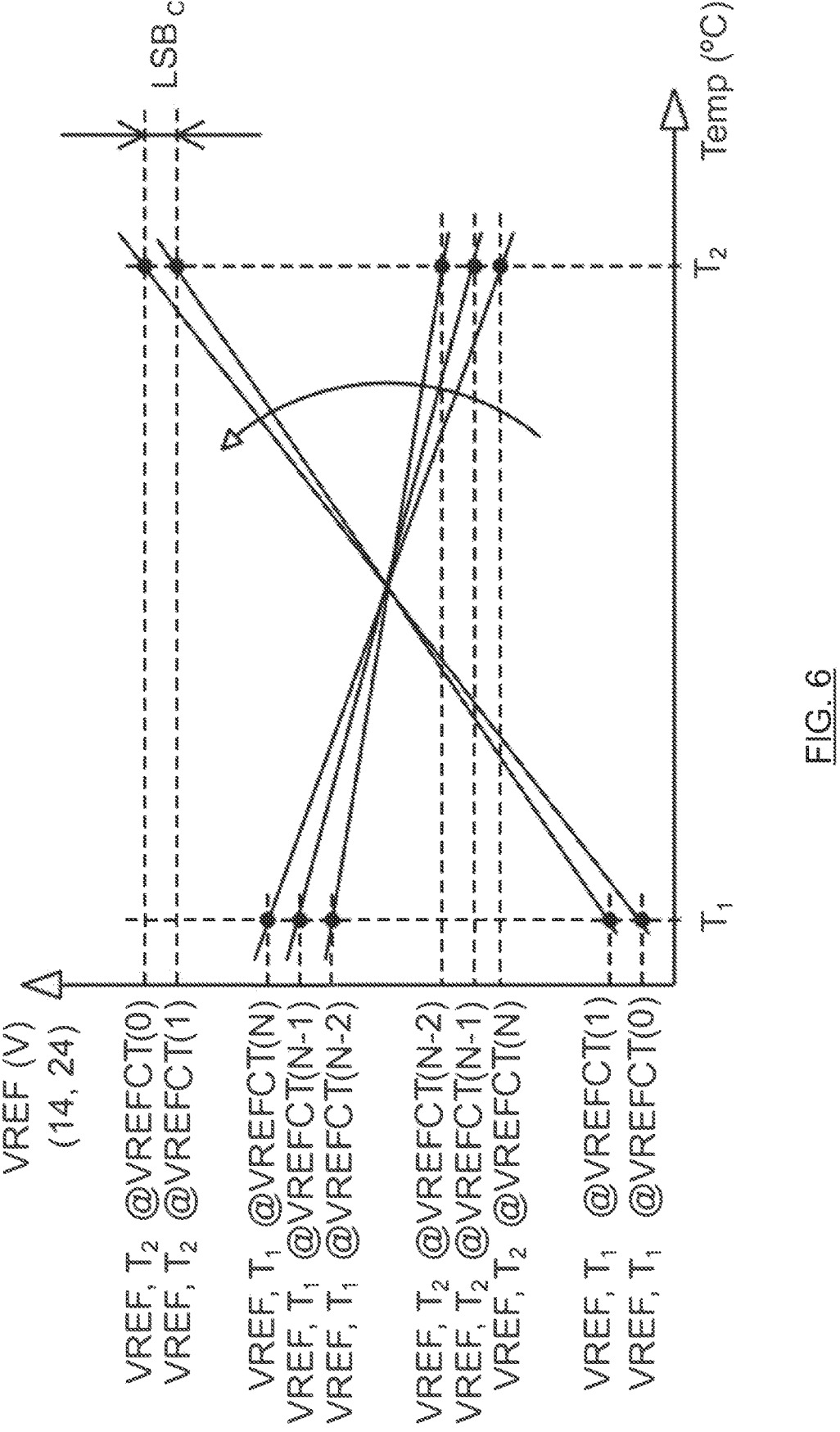
FIG. 6: Temperature coefficient (TC) variation with programmable voltage reference.

FIG. 6 represents the temperature coefficient (TC) behaviour of the voltage reference VREF (14, 24) with programmable TC. By VREF, T1 @REFTC(N) is meant the voltage reference VREF (in volts) at temperature T1 for code REFTC(N). In particular, the graph shows how by means of a digital control signal REFCT(N−1:0), where N is the number of bits composing such a digital signal (identified as 41 in FIG. 1), the TC of the reference voltages (14, 24) can be programmed with a minimum increment or change according to the granularity of the digital code. That is, by changing the Least Significant Bit (LSB) of the digital code, the smallest possible change in the TC of the reference voltages (14, 24) is applied. The minimum change in the reference voltage TC (14, 24) is therefore equivalent to the change in the reference voltage TC when switching between two consecutive digital control signal codes (41). It is further understood that the ratio between the maximum change and the minimum change in the TC of said voltage references is a function of the number of bits N of the digital control signal (41).

According to some embodiments of the present invention, see FIG. 2, the floating gate sensor (100, 200) incorporates a secondary transconductor element (104) connected to a reference voltage (14, 24). The particularity is that this reference voltage is provided by the voltage reference module (40) which allows to change its temperature coefficient $TC_{VREF}$ by means of a digital configuration signal (41), see FIG. 1. In this way, said temperature coefficient, TC, can be adjusted during a thermal calibration process of the device (1), so as to cancel the thermal dependence of the sensor $CT_{SENSOR}$ or to adjust it to a value as close to zero as possible.

This thermal calibration process can be carried out individually on each dosimeter, where the device (1) is integrated, once the dosimeter has been manufactured and put into use, so that the process can be robustly implemented in large-scale industrial production.

The described reference voltage (14, 24) is characterised by having a range of temperature coefficients between a maximum value $TC_{MAX}$ and a minimum value $TC_{MIN}$, as well as a minimum variation in the value of the said coefficient $LSB_{TC}$ (minimum possible variation in the temperature coefficient, see again FIG. 6). Accordingly, the $TC_{VREF}$ coefficient can be adjusted between $TC_{MAX}$ and $TC_{MIN}$ with a resolution equal to $LSB_{TC}$. These parameters are programmable and sized to ensure that the temperature coefficient of the floating gate capacitance $TC_{CSENS}$ (101, 201) lies between $TC_{MAX}$ and $TC_{MIN}$. Thus, the thermal response of the device can be cancelled, ensuring a maximum error defined by the $LSB_{TC}$ resolution of the voltage reference module (40).

Together with the described voltage reference, the device incorporates a temperature sensor (30) integrated in the same semiconductor substrate as the other elements. The temperature sensor (30) has a linear and deliberately high thermal response. This temperature sensor (30) can be used to correct any residual temperature response of the floating gate sensor (100, 200) via post-processing and/or to perform a thermal calibration procedure as detailed below.

Figure 7:
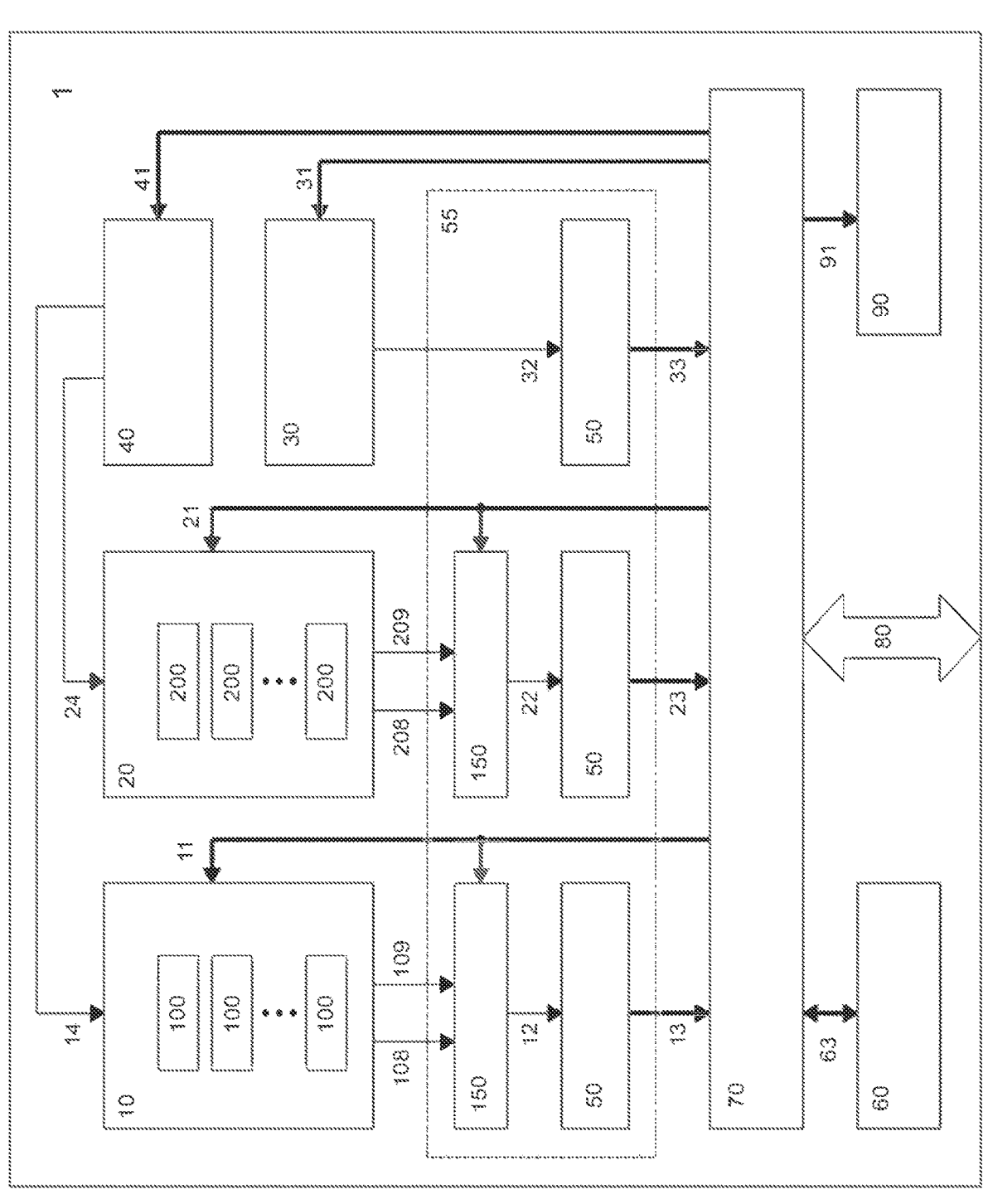
FIG. 7: Schematic block diagram of the device additionally incorporating a heater.

FIG. 7 depicts an implementation of the invention wherein the device (1) optionally has a controlled heating capability. A heater module (90) is incorporated to provide a controlled increase in the temperature of the device (1) in response to a control signal from the heater (91). The heater module may consist of any type of resistive element that generates heat by applying an electric current to it. Such is the case of a resistor or set of resistors which dissipate the electrical energy applied to them in the form of heat according to the Joule effect. These resistors may be distributed at different points of the dosimeter device in order to ensure that the heating is as homogeneous as possible. The heater module (90) can be used with the temperature sensor (30) and the programmable voltage reference (40) to carry out a temperature calibration procedure as explained below.

Figure 8:
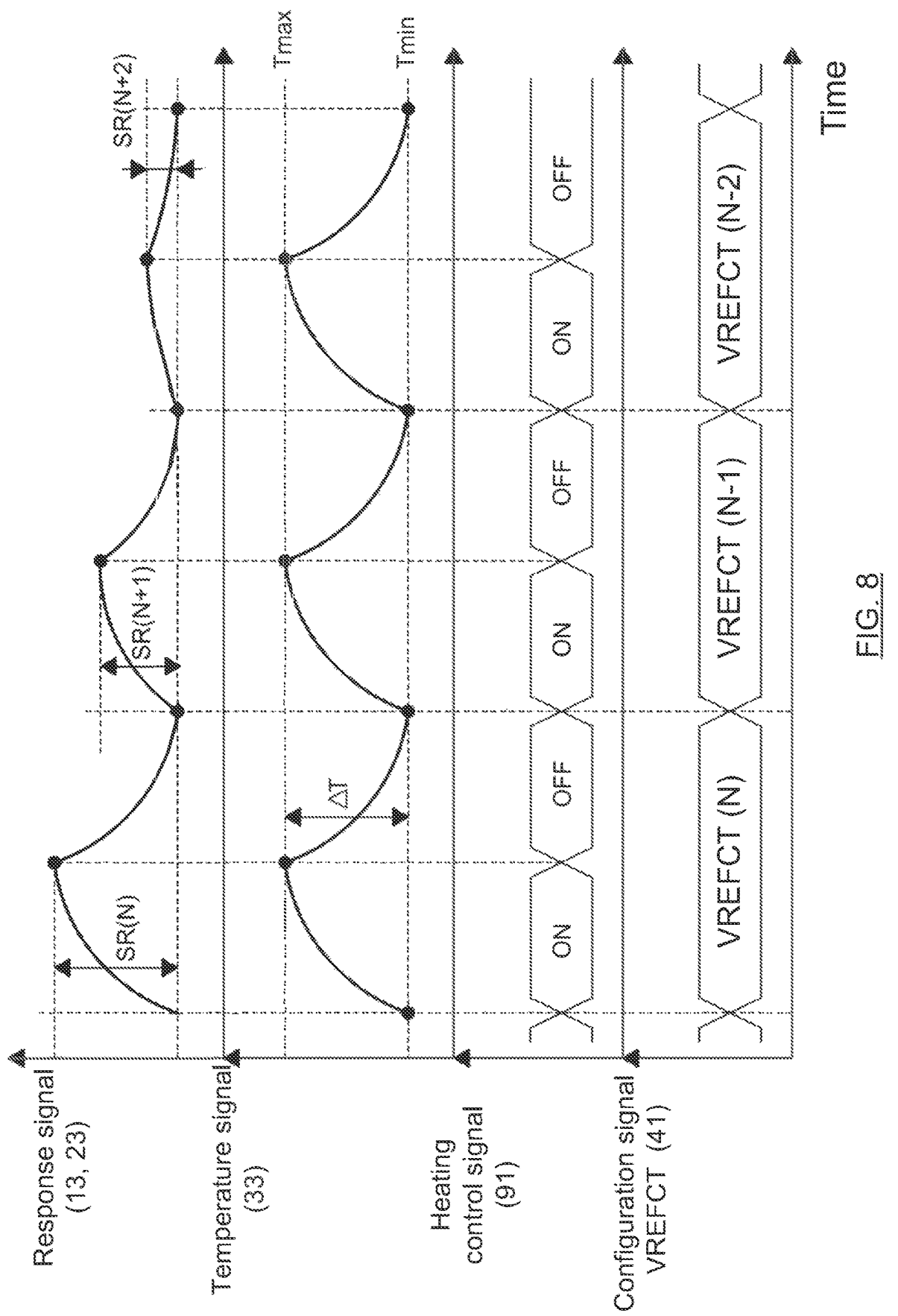
FIG. 8: Example of a temperature self-calibration procedure using a heater, a voltage reference with programmable temperature coefficient and a temperature sensor.

FIG. 8 illustrates in a timeline a possible sequence of the temperature calibration procedure implementable in the embodiment of FIG. 7.

From bottom to top, a digital signal REFCT(x) configuration of the voltage reference module (41) is shown which allows the temperature coefficient of the voltage references (14, 24) to be varied, as illustrated in FIG. 6.

By means of a heater control signal (91), the heater is cyclically activated and deactivated, causing N heating and N cooling cycles in the device. The temperature of the device is monitored by the temperature sensor (30). This calibration procedure may be subject to some form of control, either internal or external to the device, such that the temperature variation experienced by the device during each of these heating/cooling cycles is between maximum and minimum temperature values $T_{MAX}$ and $T_{MIN}$ respectively.

During each of these heating/cooling cycles, the response of the first and second sets of sensors is measured to produce a digital signal from the first set (13) and a digital signal from the second set (23) to determine the degree of variation in response to a measured temperature variation (33).

In each of these heating and cooling cycles, the temperature coefficient of the reference voltage of the first and second sets (14, 24) is amended by the digital signal REFCT(x) configuration of the voltage reference module (41). Thus, by an iterative process, it can be determined which value of the digital signal configuration of the voltage reference module (41) results in the least variation in the digital signal of the first set (13) and in the digital signal of the second set of second set (23), this being the configuration that equates to an optimum temperature coefficient $TC_{VREF}$.

As explained in the state of the art, another variable that can limit the minimum detection capacity of floating gate sensors is their humidity dependence. To mitigate or correct the effects of humidity in the device, the floating gate capacitances (101) and (201) are designed in such a manner that they have an identical or similar humidity dependence to each other. Thus, the first sensor (100) and the second sensor (200) will also present an identical or similar response with respect to humidity.

According to this, the humidity dependence of the device can be mitigated or corrected by combined reading of the first (10) and the second (20) set.

A possible implementation of this is to subtract the reading of the second set (20) from the reading of the first set (10). Since the second set of sensors (20) has a sensitivity to ionizing radiation significantly lower than first set of sensors (10), the action of subtracting the reading of the second set from the reading of the first set does not significantly affect the effective sensitivity to ionizing radiation of the combined reading.

For example, if the sensitivity of the second set (20) is 100 times lower than that of the first set (10), the effective sensitivity of the combined reading of both sets is reduced by only 1% compared to the original sensitivity of the first set (10).

The exact sensitivity of the floating gate sensors may be subject to variations within a certain range due to possible variations during the manufacturing process of the device.

This is normally corrected by individual calibration of the dosimeters within the device prior to use. Such individualised calibration includes applying a known dose of ionising radiation and measuring the response of the device to that dose. Thus, the exact sensitivity of the particular device is determined. This case-by-case calibration can be carried out as part of the final process of putting the dosimeter into use.

It should be understood that the integration of such individualised calibration involves a radiation test in the standard manufacturing and qualification chain of a large-scale integrated circuit and is a cost-intensive ad hoc operation for industrialisation and mass production.

Moreover, the fact that no control measures are carried out on the real sensitivity of the floating gate sensors during the manufacture and qualification of the integrated circuits may represent a high risk, since in the event of a defective device (whose sensitivity is outside a certain range), this will not be detected until the final calibration of the dosimeter.

The fact of not being able to detect a defective device (from the point of view of the sensitivity of its sensors) until the final calibration prior to putting the dosimeter into use represents a significant inconvenience for industrialisation.

To this end, some element and/or methodology is desirable to estimate the sensitivity of the sensors (100, 200) of the device (1) without the need to irradiate the device, so that it is possible to detect as early as possible if any device or batch of devices show sensitivities outside the expected range.

The device may incorporate, for this purpose, a sensitivity tester (60) that allows an estimation of the sensitivity of the floating gate sensors by means of an electrical measurement. Thus, this measurement can be carried out at any time during an integrated circuit testing process, together with the rest of the standard electrical tests that are carried out during a standard test and qualification process.

One possible method of estimating the sensitivity of the sensor to radiation by electrical measurements is to measure the electrical capacitance of the floating gate capacitor, since the sensitivity is inversely proportional to the electrical capacitance.

Thus, the device incorporates a replica of the floating gate capacitance and/or capacitances (101, 201) connected to an electrical capacitance measurement system. This set constitutes the sensitivity tester (60).

Finally, it should be noted that the various embodiments of the device described above could be integrated into a dosimeter. In this way, for example, a dosimeter may include one or more devices, in addition to other elements, such as radiation filters, batteries, other semiconductor devices for wireless communication, a GPS positioning unit, etc.

The different realisations of the device are compatible with standard CMOS (or CMOS compatible) manufacturing processes. Preferably, the different device realisations can be monolithically integrated on the same semiconductor material substrate. Thus, it can be produced on an industrial scale and at reduced cost.

The present invention is not limited to the particular implementations described above, but the invention shall include all implementations falling within the scope of the attached claims.

The invention claimed is:

1. A device for detecting ionising radiation comprising:

a first set with a plurality of primary floating gate sensors with a cumulative response proportional to a received ionising radiation, wherein each primary floating gate sensor of the plurality of primary sensors is independent of each other;

a second set with a plurality of secondary floating gate sensors with a cumulative response proportional to a received ionising radiation, wherein each secondary floating gate sensor of the plurality of secondary gate sensors are independent of each other;

wherein each primary sensor comprises a first floating gate capacitance for having a sensitivity to ionising radiation above a first threshold;

wherein each secondary sensor comprises a second floating gate capacitance for having a sensitivity to ionising radiation above a second threshold, the second floating gate capacitance being different to the first floating gate capacitance;

wherein the second threshold is lower than the first threshold, whereby the first set is configured to detect ionising radiation in a first range and the second set is configured to detect ionising radiation in a second range, wherein the first range is lower than the second range.

2. The device according to claim 1, wherein the primary sensor and the secondary sensor are CMOS type sensors, wherein both sensors comprise:

a floating gate capacitance configured to store an electrical charge, wherein the stored electrical charge varies, and is reduced, in the presence of ionising radiation;

a recharge circuit configured to supply an electrical charge to the floating gate capacitance;

a primary transconductor configured to convert a voltage produced in the floating gate capacitance into a measuring electric current, wherein the measuring electric current is controlled by a switch;

a secondary transconductor configured to convert a reference voltage to a reference electric current, wherein the reference voltage is independent of ionising radiation, wherein the reference electric current is controlled by the switch;

wherein the stored electrical charge is reduced by a different rate of variation in the primary sensor and the secondary sensor.

3. The device according to claim 2, wherein the dielectric material of the floating gate capacitance is the same for a primary floating gate sensor and for a secondary floating gate sensor.

4. The device according to claim 3, comprising a voltage reference unit with an active circuit configured to generate, using a digital configuration signal, at least one reference voltage for a plurality of secondary transconductors of a set of sensors, wherein the voltage reference unit is configured to adjust the reference voltage, as a function of a temperature coefficient, CTCSENS, of the floating gate capacitance, to modify the thermal response.

5. The device according to claim 2, wherein a sensor of the set further comprises a switch to control the measuring electric current of the primary transconductor and to simultaneously control the reference electric current of the secondary transconductor.

6. The device according to claim 5, further comprises an information storage and control unit configured to:

deactivating one or more sensors of at least one of the sets via a configuration signal associated with the switch.

7. The device according to claim 5, wherein the information storage and control unit is configured to receive information about the plurality of the measuring electric currents and the reference electric currents of the sensors of the second set when the detected ionising radiation exceeds the first range.

8. The device according to claim 5, further comprises a conversion unit with an averaging and readout unit for calculating an amount of ionising radiation based on a comparison between a plurality of reference electrical currents and measurement currents for the non-deactivated sensors of the first and/or the second set.

9. The device according to claim 8, wherein calculating the amount of ionising radiation comprises calculating, the arithmetic mean of the measuring electric currents to obtain an averaged measuring electric current and the arithmetic mean of the reference electric currents to obtain an averaged reference electric current.

10. The device according to claim 8, wherein the storage and control unit is configured to sequentially connect the averaging and readout unit to the first set or the second set using a multiplexer.

11. The device according to claim 8, wherein the conversion unit contains an analogue to digital converter, ADC coupled with an averaging and subtraction unit to provide digital information about the plurality of the measuring electric currents and the reference electric currents of the sensors of at least one of the sets.

12. The device according to claim 2, wherein humidity dependence is corrected or mitigated by means of a combined reading of the first set of sensors and the second set of sensors.

13. The device according to claim 5, comprising:

a temperature sensor configured to provide an analogue temperature signal independent of ionising radiation and proportional to the temperature value;

a heater unit configured to vary the temperature in response to an electrical control signal for switching on or off.

14. The device according to claim 13, wherein the heater unit is configured to produce a sequence of heating and cooling cycles, monitored by the temperature sensor in which the response signal of the first set and the response signal of the second set are measured, the degree of variation as a function of the measured temperature is determined, and a value of the digital signal setting of the voltage reference unit associated with a smaller variation is determined.

15. The device according to claim 5, comprising a sensitivity tester configured to estimate the sensitivity of at least one of the sensors by measuring the electrical capacitance of the floating gate capacitor.

16. A dosimeter comprising the device for detecting ionising radiation according to claim 1, wherein the device is fabricated monolithically on a single substrate of semiconductor material.

* * * * *